Dec. 19, 1950    R. A. STURDY    2,535,000
INSECTICIDAL COMPOSITION COMPRISING
DDT AND METHOXYCHLOR
Filed April 29, 1949
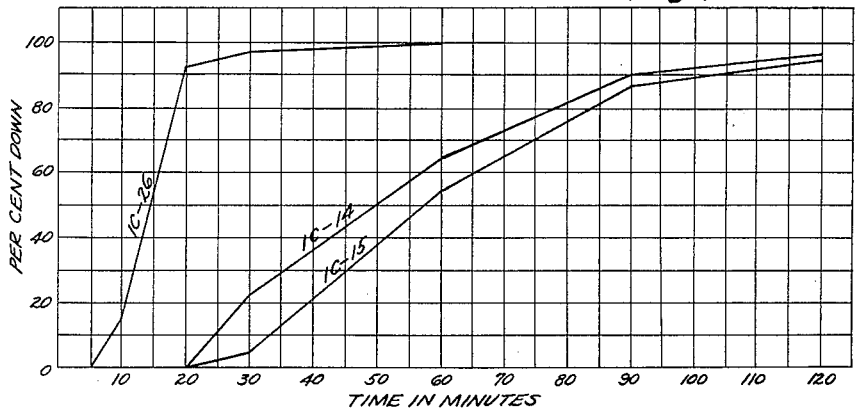
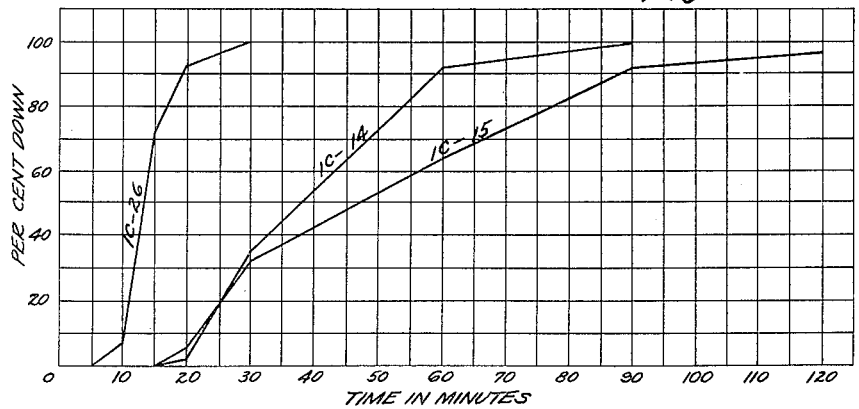
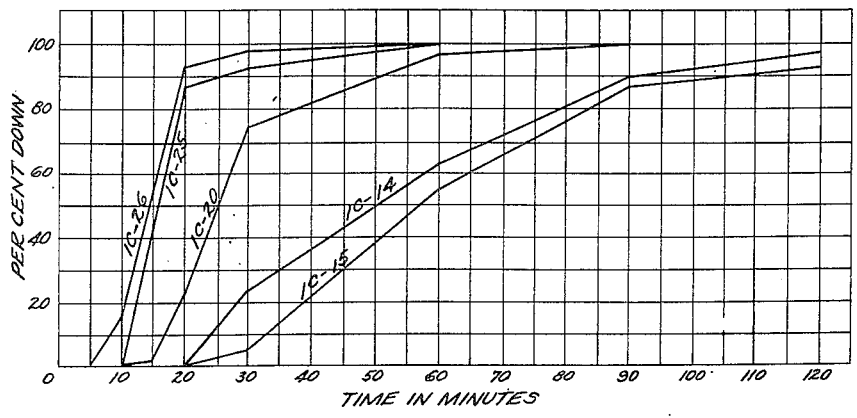
INVENTOR:
ROBERT A. STURDY
BY Cromwell, Greist & Warden
ATTYS.

Patented Dec. 19, 1950

2,535,000

UNITED STATES PATENT OFFICE 2,535,000

INSECTICIDAL COMPOSITION COMPRISING DDT AND METHOXYCHLOR

Robert A. Sturdy, Quincy, Ill., assignor to Moorman Manufacturing Company, Quincy, Ill., a corporation of Illinois Application April 29, 1949, Serial No. 90,405

8 Claims. (Cl. 167—30)

The present invention relates to new and useful insecticide compositions the active ingredients of which are DDT and methoxychlor.

DDT is the abbreviation in general usage for designating the compound dichlorodiphenyl trichloroethane. The preparation of this compound is known and is disclosed at several places in the literature. The term "methoxychlor" is used herein to designate the compound 2,2-bis (p-methoxyphenyl) 1,1,1-trichloroethane. This compound may be prepared in accordance with a known manner. The technical grades of DDT and methoxychlor are suitable for the purposes of the present invention. Technical DDT is considered to be substantially pure. Technical methoxychlor has a purity of approximately 88-90 per cent, and the balance also consists of related compounds. Other commercial forms of DDT and methoxychlor may also be used.

In recent years there has been extensive usage of DDT as the active ingredient in a number of commercial insecticide compositions. Although DDT by itself is a very effective insecticide, it has been found that, on prolonged usage, species of insects which were initially very sensitive to, and easily controlled by, DDT, develop an increased resistance thereto to the point where normal concentrations of DDT are not sufficiently effective.

Thus, numerous instances have come to light where, after a commercial DDT composition has been successfully used for killing and controlling flies for several consecutive seasons, the flies develop an apparent immunity or resistance to DDT, even in much greater concentrations than previously were found to be highly effective. In such instances, which apparently are becoming increasingly numerous, the present commercial DDT preparations do not give effective or satisfactory results.

In accordance with the present invention, it has been found that the effectiveness of DDT with respect to strains of flies having resistance thereto, may be restored to normal and even increased beyond normal potency, by combining therewith in effective or synergistic proportions the compound methoxychlor.

The primary object of the present invention is the provision of an insecticide composition containing DDT and methoxychlor as active ingredients thereof, which compositions have normal or increased effectiveness or potency with respect to such strains of flies as have been found to exhibit marked resistance to DDT alone, and increased potency with respect to flies which are non-resistant to DDT.

A more specific object of the invention resides in the provision of insecticide composition containing DDT and methoxychlor, which compositions may take several different forms and include various ingredients. For example, one of the preferred forms of the DDT-methoxychlor insecticide compositions is that of an oil concentrate including a small amount of a suitable emulsifying agent whereby the composition may be mixed with water and considerably diluted thereby, in which condition it may advantageously be used as a spray for covering many different surfaces. Another form in which the DDT-methoxychlor combination may be embodied is that of a water dispersible powder or paste which upon being mixed with water may be used as a whitewash or similar coating having insecticidal characteristics. Still other forms in which the DDT-methoxychlor combination may be used include dusting powders, oil base sprays, aerosol-forming compositions, etc.

Certain other objects of the invention will, in part, be obvious and will, in part, appear hereinafter.

For a more complete understanding of the nature and scope of the invention reference may now be had to the following detailed description thereof wherein certain presently preferred compositions are set forth and constitute illustrative embodiments of the invention.

In the accompanying drawings, graphs are given which serve to show the unexpected utility of the DDT-methoxychlor combinations, and to which reference will be made hereinafter.

For practical reasons, the DDT-methoxychlor insecticide compositions of the present invention are, as in the case of the previous DDT compositions, produced and distributed in several different forms depending upon the particular application to which the compositions are to be put. One of the more important uses and applications of this type of insecticide composition is that of a general purpose spray to be applied to a wide variety of surfaces in which case the so-called residual killing effect of the active ingredients is taken advantage of. For the purpose of this type of use and application, the DDT-methoxychlor insecticide composition may be produced and sold in the form of an oil concentrate which may be diluted with relatively large bodies of water before the material is sprayed, for example, on livestock, walls, ceilings and floors of buildings, vegetation, ground areas around barns and garbage dumps, etc. Such oil concentrate compositions ordinarily contain a suitable emulsifying agent or agents so as to promote a uniform and stable mixture with water.

The DDT-methoxychlor combination of the present invention also can be used to advantage as a component of surface covering materials, such as a whitewash type composition. In this case the composition is put out in powder or paste form and the user mixes the proper amount of water thereto and then applies it to the surface to be coated as by spraying, brush or other suitable means. In this type of composition, the residual killing properties of the DDT-methoxychlor composition are relied upon. Such a powder composition also may be used as an insecticidal dust.

Still another use for the DDT-methoxychlor composition is as an ingredient of stock or animal sprays containing pyrethrum or isothiocyanates, which have a "knock-down" or immediate killing effect on such insects as flies. In this case, the animal sprays are usually put out in a form in which they are to be used, so that the livestock man or others may use the composition as purchased without dilution with water or other liquids.

It will be understood and appreciated by those skilled in the art that the novel DDT-methoxychlor combination of the present invention may be utilized in other forms and compositions than those referred to above and for the control of insects other than flies. The DDT-methoxychlor combinations are not normally provided in pure or extremely concentrated form, but rather in combination with other materials which, in general, serve as carriers for the DDT-methoxychlor combinations. However, the DDT-methoxychlor couple may be used in pure form when advantageous.

Although DDT is active as an insecticide against a rather large variety of insects, one of its more important applications as an insecticide is its use in the control of flies. As was mentioned above, it has now been established and recognized that certain strains of flies develop a marked resistance to DDT over a period of time. The exact nature of this increased resistance is not fully known at this time and is not important in so far as an understanding of the present invention is concenred. However, since such increased resistance to DDT was not encountered in the initial use of this insecticide, it appears that the subsequent occurrence of strains of flies which are DDT-resistant after several seasons of satisfactory control with this insecticide indicates a natural development in certain strains of flies which were probably initially sensitive to DDT to a normal degree.

In order to evaluate with reasonable accuracy the effectiveness of DDT insecticide compositions and the improved DDT insecticide compositions of this invention, it was necessary to establish standardized testing techniques and equipment.

The testing equipment was simple and, for the most part, consisted of a series of cylinders of uniform size which were open at opposite ends, with the ends being closed by screens of suitable mesh to prevent escape of flies from the cylinder. The test to evaluate the effectiveness of various insecticide compositions and the resistance of different strains of flies thereto followed a standardized pattern. Briefly, a group of the cylinders would be uniformly sprayed with a measured amount of the insecticide compositions undergoing evaluation, certain of the cylinders normally being sprayed with DDT insecticide compositions of known effectiveness to serve as controls. Then, batches of flies of approximately the same number were introduced into each of the cylinders and thereafter, at the end of regular intervals, the number of flies which were down and apparently inactivated, would be counted and noted. At the end of the test, a count would be taken of the number of flies in each cylinder and then the previous readings would be expressed in terms of percentage of flies down at any particular time.

Extended experiments with this type of test or evaluation has established that it is sufficiently accurate for rather accurate work. It will be understood that the results set forth in the various tables given below and accompanying graphs were obtained in accordance with the testing technique described above.

The data contained in Table 1 below shows the marked increase in resistance which certain strains of flies offer to DDT in comparison with strains of flies exhibiting normal resistance. The first series of tests given in Table 1 were obtained with cylinders which had been sprayed with a whitewash type coating powder containing 1 per cent concentration of DDT (dry basis), the powder being dispersed in water and each of the test cylinders being sprayed with equal amounts of the same composition. The strain of flies designated as "Elkholm" was a strain that had been reported to be DDT-resistant. The control or reference strain of flies designated as "Laboratory" was a strain that exhibited a normal sensitivity to DDT. After the cylinders had been sprayed and allowed to stand for 26 days, the flies were introduced thereinto and readings were taken at the intervals indicated and the results entered in terms of percentage of flies introduced which were downed at the time of each reading.

Similar tests were conducted with compositions containing 2 and 5 per cent concentrations of DDT, as shown in Table 1.

It is apparent from an examination of the data in Table 1 that the Elkholm strain of flies showed a marked increase in resistance in comparison with the non-resistant strain of flies used as a standard or control.

Table 1

| | No. Flies Used | No. and Per Cent Knock Down | | No. and Per Cent Kill in Hours | | | | | | | | |
|---|---|---|---|---|---|---|---|---|---|---|---|---|
| | | 10 Min. | 20 Min. | ½ | 1 | 1½ | 2 | 3 | 4 | 5 | 6 | 24 |
| TRIPLE X-1% DDT | | | | | | | | | | | | |
| | | Per cent | Per cent | Per cent | Per cent | Per cent | Per cent | Per cent | Per cent | Per cent | Per cent | Per cent |
| Elkholm | 59 | 0 | 0 | 0 | 0 | 3 | 3 | 5 | 9 | 17 | 17 | 82 |
| Laboratory | 66 | 0 | 0 | 0 | 0 | 21 | 27 | 79 | 85 | 90 | 90 | 99 |

Table 1—Continued

| | No. Flies Used | No. and Per Cent Knock Down | | No. and Per Cent Kill in Hours | | | | | | | | |
|---|---|---|---|---|---|---|---|---|---|---|---|---|
| | | 10 Min. | 20 Min. | ½ | 1 | 1½ | 2 | 3 | 4 | 5 | 6 | 24 |
| TRIPLE X-2% DDT | | | | | | | | | | | | |
| Elkholm | 42 | 0 | 0 | 0 | 8 | 48 | 48 | 48 | 48 | 62 | 62 | 81 |
| Laboratory | 60 | 0 | 0 | 0 | 37 | 100 | | | | | | 100 |
| TRIPLE X-5% DDT | | | | | | | | | | | | |
| Elkhlom | 58 | 0 | 0 | 0 | 35 | 66 | 67 | 69 | 69 | 72 | 72 | 95 |
| Laboratory | 63 | 0 | 0 | 3 | 67 | 100 | | | | | | 100 |

In accordance with the present invention, as stated above, it was found that the compound known as methoxychlor when combined with DDT provided a combination which was found to be substantially as effective against DDT-resistant flies as against flies of normal DDT sensitivity. Furthermore, this DDT-methoxychlor combination was found to be more effective against flies of normal sensitivity than DDT alone.

The DDT-methoxychlor combination exhibits synergism in respect to its insecticidal action since it has been found that the effectiveness or activity of the combination is much greater than the activity that would be postulated on an additive basis considering the individual activities of the two components taken separately. In this connection, reference may now be had to Figs. 1 and 2. In Fig. 1, three curves are plotted based on data obtained in testing oil concentrate type insecticide compositions designated as IC-15 (DDT), IC-14 (methoxychlor) and IC-26 (DDT+methoxychlor). All three compositions contained 30 per cent concentration of insecticide, and were diluted with water sufficiently to reduce the insecticide concentration, in each case, to 2 per cent by weight. The diluted compositions were evaluated according to the test technique outlined above using flies which were non-resistant to DDT. The data plotted was obtained using cylinders which had been sprayed 14 days earlier. It will be noted that composition IC-26 containing DDT and methoxychlor exhibited much greater activity than either of the other two compositions. Since the two compositions containing only DDT or methoxychlor had approximately the same activity, the markedly increased activity of the composition containing both DDT and methoxychlor must be due to a synergistic effect.

The data plotted in Fig. 2 was obtained in the same manner and using the same three compositions as in the case of Fig. 1. The difference was that a strain of DDT-resistant flies were used in obtaining the data for Fig. 2. It will be seen that the DDT-methoxychlor composition also exhibited synergism against the DDT-resistant flies.

One respect in which the DDT-methoxychlor combination was found superior to DDT or methoxychlor alone was in respect to the degree of persistency thereof. That is the length of time over which a coating or deposit of the insecticide composition exhibited residual activity of an appreciable extent.

The synergistic action between DDT and methoxychlor appears to be present and manifest in a wide range of proportions of these two substances. Apparently, when any appreciable amount of one of the substances is present along with a larger amount of the other, synergism can be detected. I prefer to employ the two components of the synergistic couple in the ratio of one part by weight of DDT and from about 0.2 to 5 parts by weight of methoxychlor. Maximum activity against flies has been obtained with compositions containing approximately equal amounts of DDT and methoxychlor.

EXAMPLE 1

The following is my presently preferred oil base insecticide concentrate containing DDT and methoxychlor as the active insecticidal ingredients thereof:

*Approximate per cent by weight*

| | Per cent |
|---|---|
| DDT | 15 |
| Methoxychlor | 15 |
| Alkyl phenoxy polyethoxy ethanol | 5 (emulsifier) |
| Phthalic glycerol alkyd resin | |
| Aromatic petroleum solvent | 65 |

In use, one volume of the foregoing formulation is uniformly mixed with from 5 to 600 volumes of water, depending upon intended use.

The data contained in Table 2 below serves to show the comparative effectiveness and activity between the formulation of Example 1 and certain other comparative oil base insecticide concentrate formulations. In each instance, the formulation tested, prior to dilution contained approximately 30 per cent by weight of active insecticidal ingredients, e. g. DDT, DDD (i. e. Rhothane), and methoxychlor. In each formulation, the balance of the formulation consisted of the same solvent and emulsifier as used in the formulation of Example 1.

In each instance, the formulations which are designated as IC-1, IC-4, IC-5, and IC-7 are admixed with water so as to yield a diluted composition suitable for spraying having approximately 1 per cent concentration of insecticide ingredients therein. It is apparent that the formulation of Example 1 which is designated as IC-5 in Table 2 is considerably more effective than any of the other formulations evaluated therewith. Particularly does the superiority formulation IC-5 reveal itself after a period of several days, thus, after the 132nd day, only formulation IC-5 exhibited a considerable degree of effectiveness after 1½ to 2 hours.

much longer than the insecticide concentrate consisting primarily of DDT, and further it shows

Table 2
[Percent Down—Hours.]

| Formula | Time After Application | ½ | 1 | 1½ | 2 | 2½ | 3 | 3½ | 4 | 4½ | 5 | 6 | 7 | 8 | 9 | 24 |
|---|---|---|---|---|---|---|---|---|---|---|---|---|---|---|---|---|
| IC-1—25% DDT, 5% DDD | 1st day | 63 | 100 | | | | | | | | | | | | | |
| | 15th day | 17 | 73 | 85 | 90 | 94 | 94 | 96 | 98 | 100 | | | | | | |
| | 24th day | 0 | 3 | 21 | 49 | 75 | 87 | 91 | 92 | 94 | 94 | 94 | 94 | | | 100 |
| | 79th day | 0 | 0 | 0 | 0 | 0 | 0 | 0 | 0 | 0 | 9 | 45 | 61 | | | 100 |
| | 133rd day | 0 | 0 | 0 | 0 | 0 | 0 | 0 | 1 | 1 | 3 | 10 | 19 | | | 79 |
| IC-4—30% Methoxy | 1st day | 99 | 100 | | | | | | | | | | | | | |
| | 23rd day | 17 | 81 | 96 | 96 | 99 | 99 | 100 | | | | | | | | |
| | 78th day | 0 | 21 | 61 | 76 | | 88 | | 92 | | 96 | 96 | 96 | | | 100 |
| | 132nd day | 0 | 4 | 21 | 33 | | 56 | | 58 | | 60 | 65 | 67 | | | 95 |
| IC-5—15% DDT, 15% Methoxy | 1st day | 100 | | | | | | | | | | | | | | |
| | 23rd day | 100 | | | | | | | | | | | | | | |
| | 77th day | 53 | 97 | 100 | | | | | | | | | | | | |
| | 111th day | 64 | 96 | 98 | 98 | | 98 | | 98 | | | | | | | |
| | 132nd day | 0 | 57 | 81 | 96 | | 97 | | 97 | | | 97 | 97 | 97 | | 99 |
| IC-7—10% DDT, 10% DDD, 10% Methoxy | 1st day | 93 | 99 | 100 | | | | | | | | | | | | |
| | 14th day | 71 | 98 | 100 | | | | | | | | | | | | |
| | 35th day | 0 | 1 | 24 | 48 | | 86 | | 95 | | 100 | | | | | |
| | 89th day | 0 | 2 | 5 | 14 | | 22 | | 30 | | 40 | 40 | 49 | | | 96 |

In order to show the comparative activity of the several insecticide concentrate formulations in Table 2 with respect to different strains of flies, a further series of comparative tests were run and the data obtained is reported in Table 3 below. In this case, the flies designated as "Frund" and "Elkholm" were strains which had been previously tested and found to exhibit a marked resistance to DDT. It is apparent that about 133 days after a surface has been sprayed, only formulation IC-5 (that one containing DDT and methoxychlor) exhibited real effectiveness against the flies in a matter of 2 hours. It will also be noted that the formulation IC-5 was effective against the DDT-resistant strains of flies as well as the strain having normal resistance.

that the DDT-methoxychlor combination kills DDT-resistant flies, approximately as rapidly as non-resistant flies.

Table 4

| | Per Cent Kill in Hours | | | | | | | | | |
|---|---|---|---|---|---|---|---|---|---|---|
| | ½ | 1 | 1½ | 2 | 3 | 4 | 5 | 6 | 7 | 24 |
| IC-1—Laboratory house flies | 0 | 0 | 0 | 0 | 0 | 0 | 9 | 45 | 61 | 100 |
| Elkholm (DDT-resistant) | 0 | 0 | 1 | 1 | 4 | 9 | 12 | 20 | 22 | 91 |
| IC-5—Laboratory house flies | 53 | 97 | 100 | | | | | | | |
| Elkholm (DDT-resistant) | 29 | 95 | 100 | | | | | | | |

Table 3
[Type spray: 1% IC applied to cylinders and screens. Temperature 80° F.]

| Formula No. | No. Flies Used | Days After Application | Type of Flies | Per cent Kill in Hours | | | | | | | | | |
|---|---|---|---|---|---|---|---|---|---|---|---|---|---|
| | | | | ½ | 1 | 1½ | 2 | 3 | 4 | 5 | 6 | 7 | 24 |
| IC-1—25% DDT, 5% DDD | 62 | 133 | Lab | 0 | 0 | 0 | 0 | 0 | 1 | 3 | 10 | 19 | 79 |
| | 60 | 134 | Frund | 0 | 0 | 0 | 0 | 0 | 0 | 7 | 13 | 23 | 73 |
| | 84 | 135 | Elkholm | 0 | 0 | 0 | 0 | 0 | 1 | 6 | 12 | 21 | 81 |
| IC-4—30% Methoxy | 96 | 132 | Lab | 0 | 4 | 21 | 33 | 56 | 58 | 60 | 65 | 67 | 95 |
| | 69 | 133 | Frund | 0 | 0 | 6 | 14 | 29 | 41 | 43 | 49 | 64 | 97 |
| | 97 | 134 | Elkholm | 0 | 1 | 4 | 8 | 15 | 31 | 38 | 45 | 52 | 98 |
| IC-5—15% DDT, 15% Methoxy | 95 | 132 | Lab | 0 | 57 | 81 | 96 | 97 | 97 | 97 | 97 | 97 | 99 |
| | 64 | 133 | Frund | 0 | 22 | 59 | 81 | 88 | 91 | 94 | 97 | 99 | 100 |
| | 100 | 135 | Elkholm | 0 | 12 | 32 | 58 | 72 | 78 | 82 | 85 | 88 | 98 |
| IC-7—10% DDT, 10% DDD, 10% Methoxy | 111 | 89 | Lab | 0 | 2 | 5 | 14 | 22 | 30 | 40 | 40 | 49 | 96 |
| | 65 | 90 | Frund | 0 | 0 | 0 | 2 | 9 | 22 | 34 | 43 | 46 | 97 |
| | 100 | 91 | Elkholm | 0 | 0 | 0 | 2 | 4 | 14 | 19 | 26 | 40 | 95 |

The data presented in Table 4 below serves as a comparison of the activity of the DDT-methoxychlor formulation of Example 1 as compared with the formulation designated IC-1, which is a standard DDT insecticide concentrate which has been sold commercially on a rather substantial scale in the past. The data was taken after the test cylinders had been standing 78 days following spraying with the two different types of formulations suitably diluted so as to have 1 per cent effective concentrations of insecticide ingredients. The cylinders were not protected from light or dust during the 78 days. The results presented in Table 4 show that the DDT-methoxychlor combination remains effective The formulation set forth in Example 2 below is a powder which is adapted to be dispersed in water and then used as a surface coating material, e. g. as a whitewash, which also has insecticidal activity. Such a composition is particularly useful in spraying the interior of walls and ceilings of stables, chicken houses, milk houses, etc.

EXAMPLE 2

Approximate per cent by weight
DDT concentrate (50% wettable powder) ____ 6
Methoxychlor concentrate (50% wettable powder) _____ 4
Cresylic acid_____ 3
Sodium fluoride_____ 2
Pigment minerals (carrier)_____ 85

The formulation set forth in Example 3 below illustrates the use of my DDT-methoxychlor combination as a component of a livestock spray having effective knock-down properties as well as residual killing properties.

EXAMPLE 3

| | Approximate per cent by weight |
|---|---|
| DDT | 0.25 |
| Methoxychlor | 0.25 |
| Isothiocyanates | 3.5 |
| Fly spray base oil | 96.0 |

In order to indicate the useful relative proportions of DDT and methoxychlor and show the synergistic effect of the combination, a series of tests were run wherein the composition of the insecticide component ranged from only DDT and no methoxychlor, on the one hand, to only methoxychlor and no DDT, on the other hand. The results of these tests are shown in Fig. 3. Although it seems desirable to use the DDT and methoxychlor in approximately equal concentrations, it will be seen that the relative ranges or proportions may vary rather widely.

The compositions identified as IC-15 (DDT), IC-14 (methoxychlor), and IC-26 (DDT+methoxychlor) were described above in connection with Figs. 1 and 2. The composition designated as IC-20 contained 20 per cent methoxychlor and 10 per cent DDT, whereas composition IC-25 contained 10 per cent methoxychlor and 20 per cent DDT. It is apparent that all three compositions containing the DDT-methoxychlor combination exhibited synergism and that composition IC-26 containing equal amounts of DDT and methoxychlor gave the greatest activity.

It will be understood that the embodiments of my invention which I described above and set forth in the several examples have been given for the purpose of making known the presently preferred embodiments of the invention, it being understood that those skilled in the art will be able to formulate other compositions making use of the synergistic DDT-methoxychlor combination of the present invention without departing therefrom. Accordingly, all matters set forth above is to be interpreted as illustrative and not in a limiting sense.

What is claimed as new is:

1. An insecticide composition containing as active ingredients, in synergistically effective proportions, DDT and methoxychlor.

2. An insecticide composition containing as active ingredients 1 part by weight of DDT and from about 0.2 to 5 parts by weight of methoxychlor.

3. An insecticide composition containing as active ingredients approximately equal amounts by weight of DDT and methoxychlor.

4. A concentrated insecticide composition adapted to be diluted with water, comprising from about 20 to 30 per cent by weight of a mixture of DDT and methoxychlor in synergistic proportions, a minor amount of emulsifier, and the remainder consisting essentially of a hydrocarbon solvent.

5. A concentrated insecticide composition adapted to be diluted with water and comprising, in parts by weight, about 15 parts of DDT, about 15 parts of methoxychlor, about 65 parts of hydrocarbon solvent, and about 5 parts of emulsifier.

6. An insecticidal powder composition comprising DDT and methoxychlor in synergistic proportions, and the remainder consisting essentially of inert carrier material.

7. A water dispersible powder composition adapted to be used as an insecticidal surface coating comprising by weight approximately 3 per cent of DD, approximately 2 per cent of methoxychlor, and the remainder consisting essentially of inert carrier material.

8. An insecticide composition comprising a small per cent of DDT, and a small per cent of methoxychlor, dissolved in a non-aqueous solvent.

ROBERT A. STURDY.

REFERENCES CITED

The following references are of record in the file of this patent:

UNITED STATES PATENTS

| Number | Name | Date |
|---|---|---|
| 2,358,942 | Siegler | Sept. 26, 1944 |
| 2,414,193 | Durham | Jan. 14, 1947 |
| 2,420,928 | Bousquet et al. | May 20, 1947 |
| 2,442,652 | Kerr | June 1, 1948 |
| 2,447,475 | Kaberg et al. | Aug. 17, 1948 |
| 2,491,414 | Lynn et al. | Dec. 13, 1949 |
| 2,510,870 | Dieter et al. | June 6, 1950 |

FOREIGN PATENTS

| Number | Country | Date |
|---|---|---|
| 583,503 | Great Britain | Dec. 19, 1946 |

Certificate of Correction

Patent No. 2,535,000                                      December 19, 1950

ROBERT A. STURDY

It is hereby certified that error appears in the printed specification of the above numbered patent requiring correction as follows:

Columns 7 and 8, Table 2, second column thereof, third line from bottom, for "14th day" read *4th day*; column 10, line 28, for "DD" read *DDT*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*